United States Patent [19]

Nees

[11] 4,170,692

[45] Oct. 9, 1979

[54] DISPOSABLE BATTERY PACKING FOR CHARGED AND DUMPED BATTERIES

[75] Inventor: John M. Nees, Wyomissing, Pa.

[73] Assignee: General Battery Corporation, Reading, Pa.

[21] Appl. No.: 868,831

[22] Filed: Jan. 12, 1978

Related U.S. Application Data

[63] Continuation-in-part of Ser. No. 790,880, Apr. 26, 1977, Pat. No. 4,081,586.

[51] Int. Cl.² ............................................. H01M 2/12
[52] U.S. Cl. ................................... 429/48; 429/87
[58] Field of Search .............................. 429/48, 87, 89

[56] References Cited

U.S. PATENT DOCUMENTS

| | | | |
|---|---|---|---|
| 2,972,001 | 2/1961 | Clingenpeel | 429/89 |
| 3,941,617 | 3/1976 | Nees | 429/48 |
| 4,075,399 | 2/1978 | Sabatino | 429/57 |

FOREIGN PATENT DOCUMENTS 728896  7/1932  France ........................................ 429/48

Primary Examiner—Donald L. Walton
Attorney, Agent, or Firm—Benasutti Associates, Ltd.

[57] ABSTRACT

A novel battery package is described wherein a sealing strip having a plurality of minute vent holes, one for each opening in the battery case, is retained in place by a plurality of disposable inserts which retain the strip in place and which seal the strip at least around the top surface of each of the battery case venting ports. Each of the inserts are equipped with a vent aperture a portion of which is surrounded on its top surface by raised indicia which extend to the periphery of the inserts. An adhesive strip is applied to engage each disposable insert to form a circuitous venting passage therebetween. The strip also engages the sealing strip, as well as the edges of the battery case in such a manner so that, upon activation, the entire battery package may be removed and disposed of by loosening one end of the sealing strip and pulling that strip up and across the top of the battery to expose each of the fill holes for activation.

11 Claims, 5 Drawing Figures

DISPOSABLE BATTERY PACKING FOR CHARGED AND DUMPED BATTERIES

CROSS-REFERENCE TO RELATED APPLICATIONS

This application is a continuation-in-part application of my prior co-pending application U.S. Ser. No. 790,880, filed Apr. 26, 1977 entitled "Disposable Battery Package for Charged and Dumped Batteries", now U.S. Pat. No. 4,081,586, which application is specifically incorporated by reference as if fully set forth herein.

BACKGROUND OF THE INVENTION

The present invention relates to the electric storage battery art, and more particularly, to a new and improved battery package and method of making same, for shipping and storing an electric storage battery which has been charged and dumped and which contains a residual amount of electrolyte in the battery plates and cells. More particularly, the present invention is an improvement over the invention disclosed in my prior issued U.S. Pat. No. 3,941,617, the disclosure of which patent is specifically incorporated by reference as if fully set forth herein.

Charged and dumped batteries have been well known and used for decades. Such batteries are produced for many purposes, including without limitation, the prevention of spillage of electrolyte during transit and the increased storage life while the battery is being stored. In the prior art, numerous venting mechanisms have been provided so that storage battery in a fully charged condition may be stored after removal of the electrolyte for many months without material loss of capacity and without developing excessive pressure. See for example, the patent to J. L. Woodbridge U.S. Pat. No. 1,816,035, issued July 28, 1931, and the patents to C. C. Wallace, U.S. Pat. Nos. 1,758,545 and 1,907,911. These patents show vent caps with holes therein having a very small cross-section. For example, the Wallace patent shows a device which has a horizontal opening of very small diameter with respect to its length. The Woodbridge patent provides a duct which has a cross-section of a diameter not over five percent of its length. Both patents refer to a capillary duct of minute cross-section. More recently, the Sabatino U.S. Pat. No. 3,253,963 deals generally with the same problems. Similarly, please refer to abandoned patent application Ser. No. 486,662, filed July 8, 1974, entitled "Battery Vent Seal", wherein seals are disclosed which are formed with: a conical body adapted to be sealingly wedged into a fill hole opening, a surrounding lip which engages the top of the fill hole when the body is pressed into place, and a small aperture formed through the seal for resisting gas flow but permitting gas after a slight pressure build-up to be vented from the cell. Generally, these disclosures show individual vent plugs which are either rather complicated in structure or require a substantial amount of material.

SUMMARY OF THE INVENTION

It is an object of the present invention to provide a simple venting device for use in combination with a charged and dumped battery, so that the battery may be shipped and stored inexpensively and with maximum effectiveness in terms of shelf life. In furtherance of this object, I have provided a thin strip of plastic material having a plurality of indentations therein forming protrusions, each of which has a small vent hole in it. This piece of plastic is applied to all of the vent openings in a charged and dumped battery, and a plurality of disposable inserts are inserted into the vent openings for at least retaining the sealing strip against the top surface of the vent openings to form a seal therebetween.

In the preferred embodiment of applicant's invention, each of the disposable inserts comprise a top portion having a vent aperture therethrough and raised indicia on a top surface thereof. At least a portion of the raised indicia surrounds at least a portion of the vent aperture and extends across the top surface to a peripheral edge of the top portion.

An overlying tape strip spans the vent openings, sandwiches the disposable inserts between the tape and the sealing strip. A relatively long, circuitous venting passage of small cross-section(s) is thus created between the top surface of the insert and the undersurface of the tape strip. The indicia are preferably slighly spaced apart with and formed to create numerous voids, pockets or partial obstructions to maximize the fluid frictional resistance of the venting channel. In the preferred embodiment these indicia may be alpha-numeric characters. The tape strip also attaches the assembly at either end to the battery itself, so that, when activation is desired, the entire package may be peeled away from the battery and disposed of in a single motion.

The above object, as well as other objects, will become apparent from the following description with reference to the accompanying drawings.

DESCRIPTION OF THE PREFERRED EMBODIMENT

Figure 1:
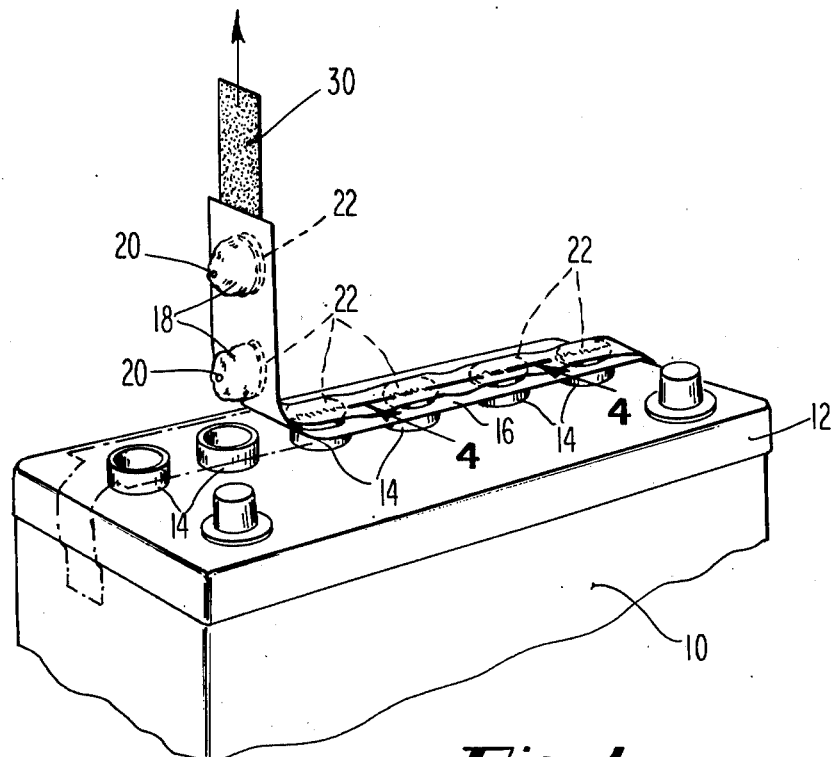
FIG. 1 is a top perspective view of a charged and dumped battery from which the preferred embodiment battery package is being peeled away, the original position of that package being shown in phantom.

Although specific forms of the invention have been selected for illustration in the drawings, and the following description is drawn in specific terms for the purpose of describing these forms of the invention, this description is not intended to limit the scope of the invention which is defined in the appended claims.

Figure 2:
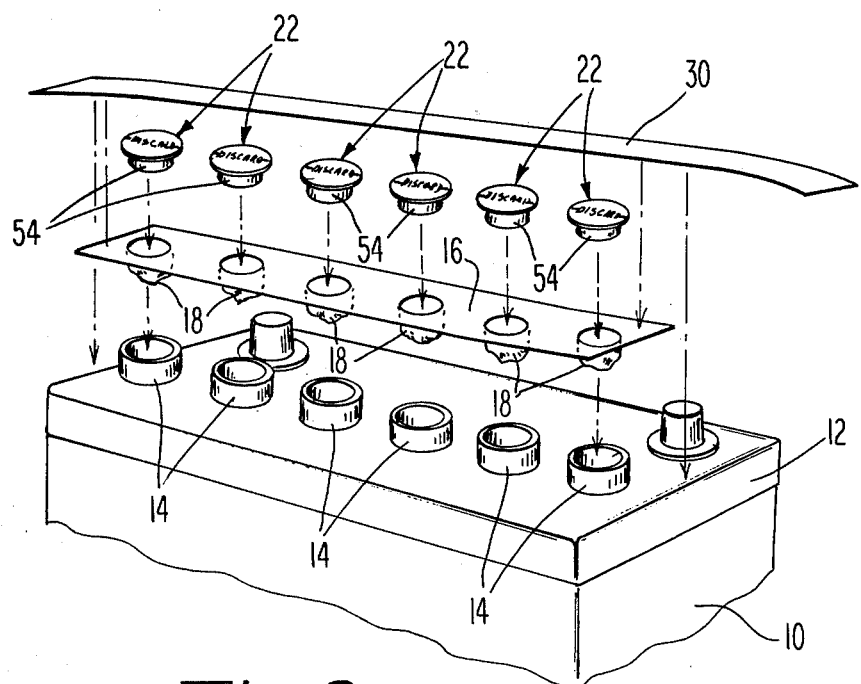
FIG. 2 is a perspective view of the battery and battery package illustrated in FIG. 1 wherein the sealing strip disposable inserts and tape are shown exploded away from the top of the battery and arrows indicating the assembly sequence of the package.

Referring to the figures, in FIGS. 1 and 2, there is shown a perspective view of an assembled battery package wherein the battery case 10 comprises a structure housing six battery cells for a lead-acid storage battery which has a cover 12, having six vent openings 14 formed integrally with the cover. A venting strip 16 is illustrated which is described in greater detail in connection with my prior U.S. Pat. No. 3,941,617, which is specifically incorporated herein by reference. Basically, this cover strip 16 is composed of a thin plastic material having a generally planar top surface in which is formed a plurality of indentations forming protrusions designated generally 18 which are generally bag-shaped but which diameters, at their intersection with the aforementioned planar surface, approximately equals the interior diameter of each of the vent walls 14. A small hole 20 is formed in approximately the center of the bottom of each bag-shaped protrusion 18. As seen particularly in FIG. 1, the strip 16 is generally rectangular having a width which substantially exceeds the width of the fill holes; as opposed to the width of the adhesive strip 30 which is applied thereover which has a width approximately equal to the outside diameter of fill holes 14.

In accordance with the preferred embodiment of the present invention, a plurality of disposable inserts designated generally 22 are provided which are constructed and function as follows: referring in particular to FIGS. 3 and 4, each disposable insert is molded of a propylene-ethylene copolymer or other similar material and comprises a disk-shaped top portion designated generally 50 having a vent aperture 52 therethrough. In the preferred embodiment, as seen particularly in FIG. 4, the outside diameter of the top portion 50 of each insert is approximately equal to the outside diameter of the fill hole into which it is to be inserted. Protruding down and away from the top portion 50 of each insert and connected thereto is an annular projection 54. In the preferred embodiment, the vent aperture 52 in the top portion 50 is located generally in the center of the top portion and allows communication of the atmosphere surrounded by the annular projection with the atmosphere on the opposite side of the top portion. In the preferred embodiment, the annular projection is generally perpendicular to the planar undersurface of the top portion 50.

The annular projection 54 is dimensioned so that a press fit is established between the disposable inserts 22 and the interior of fill holes 14 which have been fitted with the sealing strip 16 in the manner shown in the drawings. The diameter of the annular projection 54 is undersized with respect to the fill hole diameter. However, with the projections in place when the insert is positioned in the fill hole, a seal is created between the outer surface of the projections 18 of the strip 16 and the interior surface of the fill hole 14. The annular projection thus behaves as an insert retaining means for retaining the inserts in the ports relative to the interior surfaces of the ports by engaging the surfaces in a press fit through the projections.

The annular projection 54 has a tapered cross-section. In FIG. 4, the outer surface 53 of the wall is substantially perpendicular to the top portion 50 while the inner surface 55 is tapered from a maximum thickness where the projection 54 engages the top portion 50 to a thin edge 57 at the end of the projection remote from the top portion 50. This results in a relatively thin and flexible projection which aids in accommodating variations in the strip projections or fill hole walls thereby preventing distortion of the fill holes. The annular projection 54 slides into the fill hole until the underside of the top portion 50 of each insert sandwiches or compresses portions of strip 16 against the top surface of each fill hole.

Figure 3:
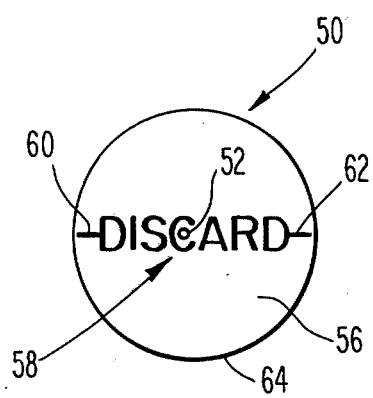
FIG. 3 is a greatly engaged planar view generally showing the top surface and indicia of the preferred embodiment disposable insert of the present invention.

FIG. 3 shows a planar view of the planar top surface 56 of the top portion 50. The planar top surface 56 comprises raised indicia designated generally 58 thereon which raised indicia is spaced at intervals across the top portion 50 of the insert. In the preferred embodiment, the raised indicia 58 comprises the capital letters DISCARD aligned across the diameter of the top portion 50 with the vent aperture 52 partially surrounded by the capital letter C. FIG. 3 also shows a dash 60 and 62 connected to each letter D and extending to the periphery 64 or edge of the top portion 50 on opposite sides of the insert. It is not necessary that the raised indicia 58 take the exact form of a series of capital letters spelling a word such as DISCARD, but it is desirable that the raised indicia 58 extend in at least one direction from the vent aperture 52 across the top planar surface 56 to the edge 64 of the top portion 50. The indicia may be discontinuous, as in the word discard, however, it is preferred that at least a portion of the indicia terminate at the edge of the insert to insure that the vent passage will remain open. The use of discontinuous indicia, and particularly, alpha-numberic characters, increases the fluid frictional resistance of the venting passages thereby minimizing the amount of air which will diffuse into the battery through this passage.

Figure 4:
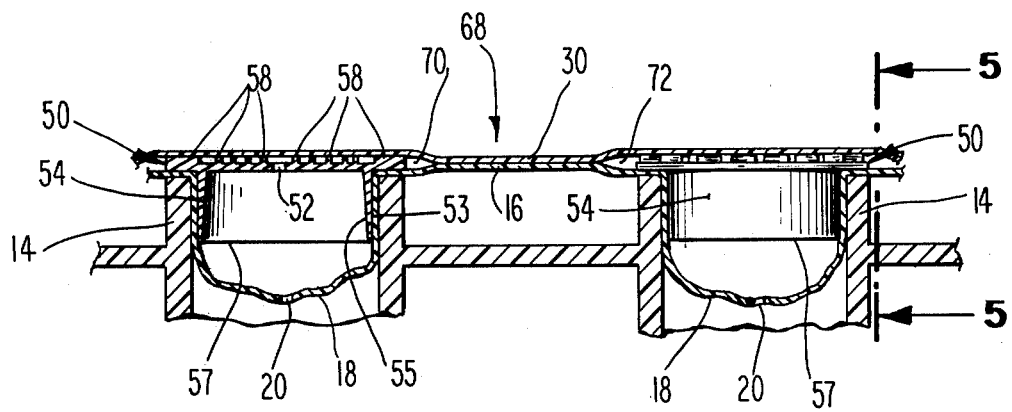
FIG. 4 is a cross-section on an enlarged scale taken as indicated by the lines and arrows 4—4 in FIG. 1.

FIG. 4 shows how the battery package appears in cross section when assembled. The parts 14 of the battery are shown with the sealing strip 16 in place. The bag-like projections 18 are shown held in place against the interior walls of the parts 14 by the annular projection 54 of the disposable inserts 22. The disposable inserts 22 are shown inserted into the ports with the underside of the top portion 50 compressing portions of the sealing strip 16 against the top surface of the ports 14. Also shown, is adhesive strip 30 which is applied generally over the inserts 22 to engage at least a portion of the raised indicia 58. The adhesive strip 30 is also seen to contact sealing strip 16 in the region between the ports designated generally 68. Because of the presence of the top portion 50 of the insert 22 and the raised indicia thereon, the adhesive strip 30 and sealing strip 16 do not engage each other over the entire distance separating the ports 14. For example, FIG. 4 shows the presence of small or minute channels 70 and 72 formed between the strips 30 and 16 running transverse to the length of the strips.

Figure 5:
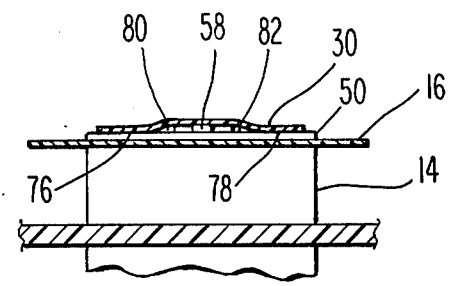
FIG. 5 is a cross-section taken as indicated by the lines and arrows 5—5 in FIG. 4.

In FIG. 5, the adhesive strip 30 is seen to contact a portion of the top portion 50 of the insert on either side of the raised indicia at regions 76 and 78. Because of the indicia, the adhesive strip 30 is raised from the top surface adjacent the indicia on either side thereof forming minute venting channels 80 and 82. Gas escapes from the battery through aperture 20, vent aperture 52 and vent channels 80 and 82 formed by the raised indicia, adhesive strip 30 and sealing strip 16. The gas flows along or adjacent to, in and around the indicia such as indicia DISCARD in FIG. 3 until channels 80 and 82 open into transverse channels such as channels 70 and 72 in FIG. 4 where the gas eventually escapes into the ambient atmosphere.

When it is desired to remove the battery package in order to activate the battery, it is only necessary to peal one end of the venting strip 30 away from the battery case as shown in FIG. 1 and to pull on the adhesive strip in a generally upward direction across the top of the case, at which time the sealing strip and disposable inserts will naturally separate from the battery and the entire package may be discarded in favor of conventional operating vent caps. Accordingly, it may be seen that the ease of removal of this package is far greater than with those prior art charged and dumped batteries where individual vents were wedged into each fill hole in order to create a seal with the interiors of those fill holes.

Finally, it may be seen that for display and sales purposes the top of the battery which is in its stored condition with the package applied presents a relatively "flush look" appearance, which may be further highlighted by altering the battery cover design so that the top surfaces of the fill holes are at or below the top surface of the cover.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the U.S. Patent and Trademark Office, and is not intended to limit the scope of the invention described and claimed herein.

What is claimed is:

1. A charged and dumped battery package, comprising:
   (a) a battery case having a plurality of venting ports therein;
   (b) battery sealing strip means disposed over at least the top surface of said ports for at least partially sealing said ports, comprising thin sheet material having a plurality of indentations thereon forming protrusions extending from one side thereof into each of said ports, each of said protrusions having a minute vent hole therein;
   (c) a plurality of disposable inserts, at least one for each port, for at least sealing said strip means with respect to said top surface of said ports, each of said inserts further comprising a top portion for compressing portions of said strip means against at least said top surfaces of said ports, said top portion having a vent aperture therethrough; and
   (d) an adhesive strip applied generally over said inserts at least in the vicinity and over said apertures, said inserts further comprising means for creating a venting channel between said top portion and said adhesive strip.

2. The invention of claim 1 wherein said means for creating a venting channel comprises raised indicia disposed on the top surface of said top portion, a portion of said indicia partially surrounding said vent aperture.

3. The invention of claim 1 wherein each of said inserts comprises insert retaining means for retaining said inserts relative to the interior surfaces of said ports by engaging said surfaces in a press fit through said protrusions.

4. The invention of claim 3 wherein said retaining means comprises an annular projection connected to said top portion and extending away therefrom.

5. The invention of claim 1 wherein said top portion comprises a substantially planar undersurface thereon for engaging said portions of said strip means.

6. A charged and dumped battery package, comprising:
   (a) a battery case having a plurality of venting ports therein;
   (b) battery sealing strip means disposed over at least the top surface of said ports for at least partially sealing said ports, comprising thin sheet material having a plurality of indentations thereon forming protrusions extending from one side thereof into each of said ports, each of said protrusions having a minute vent hole therein;
   (c) a plurality of disposable inserts, at least one for each port, for at least sealing said strip means with respect to said top surface of said ports, each of said inserts further comprising a top portion for compressing portions of said strip against at least said top surface of said ports, said top portion having a diameter substantially equal to the diameter of said port, and having a vent aperture therethrough located generally in the center of said top portion; said top portion comprising a top planar surface having raised indicia thereon, at least a portion of said raised indicia surrounding at least a portion of said vent aperture.

7. The invention of claim 6 wherein said raised indicia extends in at least one direction from said vent aperture across said top planar surface to the peripheral edge of said top portion.

8. The invention of claim 7 wherein said battery package further comprises an adhesive strip applied generally over said inserts to engage at least a portion of said indicia and a portion of said top portion adjacent thereto to form at least one minute vent channel along said indicia.

9. The invention of claim 8 wherein said adhesive strip has a diameter substantially equal to said diameter of said top portion.

10. The invention of claim 7 wherein said raised indicia extends across the diameter of said top portion.

11. A closure for a charged and dumped lead-acid battery having a plurality of fill holes therein comprising:
   (a) a plurality of inserts, at least one for each fill hole, for insertion into said fill holes to seal said fill holes with respect to said insert, said insert comprising a substantially planar top surface overlying said fill holes and having an aperture formed therethrough to provide fluid communication with the interior of said battery, said top planar surface having raised indicia formed thereon at least partially surrounding said aperture and extending substantially continuously to at least one peripheral edge of said top planar surface; and
   (b) at least one adhesive strip extending across, overlying and adhering to at least a portion of said top surface of said inserts to form at least one venting channel between said strip and said top surface, said venting channel extending at least between said aperture and the periphery of said insert.

* * * * *